United States Patent
Shetty

(10) Patent No.: US 7,271,128 B2
(45) Date of Patent: Sep. 18, 2007

(54) ORGANIC COMPOSITIONS AND METHODS OF USE FOR PROMOTING PLANT GROWTH

(75) Inventor: Kalidas Shetty, Amherst, MA (US)

(73) Assignee: Iceland BioEnhancers, LLC, Harrison, NY (US)

( * ) Notice: Subject to any disclaimer, the term of this patent is extended or adjusted under 35 U.S.C. 154(b) by 366 days.

(21) Appl. No.: 10/691,360

(22) Filed: Oct. 22, 2003

(65) Prior Publication Data

US 2005/0086987 A1  Apr. 28, 2005

(51) Int. Cl.
- *A01N 65/00* (2006.01)
- *A01N 63/02* (2006.01)
- *A01N 59/02* (2006.01)
- *C05F 1/00* (2006.01)
- *C05F 11/08* (2006.01)

(52) U.S. Cl. .................... 504/117; 504/116.1; 504/118; 504/123; 504/189; 504/287; 424/520; 424/713; 71/8; 71/16; 71/23; 47/58.1 R

(58) Field of Classification Search ............. 504/116.1, 504/117, 118, 123, 189, 287; 424/520, 713; 71/8, 16, 23; 47/58.1 R
See application file for complete search history.

(56) References Cited

U.S. PATENT DOCUMENTS

| | | | | |
|---|---|---|---|---|
| 4,043,788 A | * | 8/1977 | Fryer | 71/29 |
| 4,383,845 A | * | 5/1983 | Rutherford | 71/16 |
| 5,876,479 A | * | 3/1999 | Hedgpeth, IV | 71/11 |
| 5,906,941 A | | 5/1999 | Shetty | |
| 2004/0156920 A1 | * | 8/2004 | Kane | 424/725 |

OTHER PUBLICATIONS

Michael C. Milazzo, et al., Stimulation of Benzyladenine-Induced in Vitro Shoot Organogenesis and Endogenous Proline in Melon (Cucumis melo L.) by Fish Protein Hydrolysates in Combination with Proline Analogues, J Agric. Food Chem., 1999, 47, 1771-1775.

I. M. Mackie, Fish Protein Hydroysates, Process Biochemistry, Jan./Feb. 1982, pp. 26-31.

I. N. Tatterson, et al., Fish Silage, Ministry of Agriculture, Fisheries and Food, Humber Laboratory, Wassand St. Hull HU3 4 AR, England, pp. 369-379.

* cited by examiner

*Primary Examiner*—John Pak
(74) *Attorney, Agent, or Firm*—Mathews, Shepherd, McKay & Bruneau, P.A.

(57) ABSTRACT

Compositions for increasing valuable agronomic traits in plants are provided comprised of seaweed extract and fish hydrolysate. Methods of preparing compositions of the invention are provided which comprise mixing seaweed extract with fish hydrolysate and fermenting the mixture. Methods of increasing at least one valuable agronomic trait in a plant are provided comprising applying a composition comprising seaweed extract and fish hydrolysate to the plant.

21 Claims, 6 Drawing Sheets
(5 of 6 Drawing Sheet(s) Filed in Color)

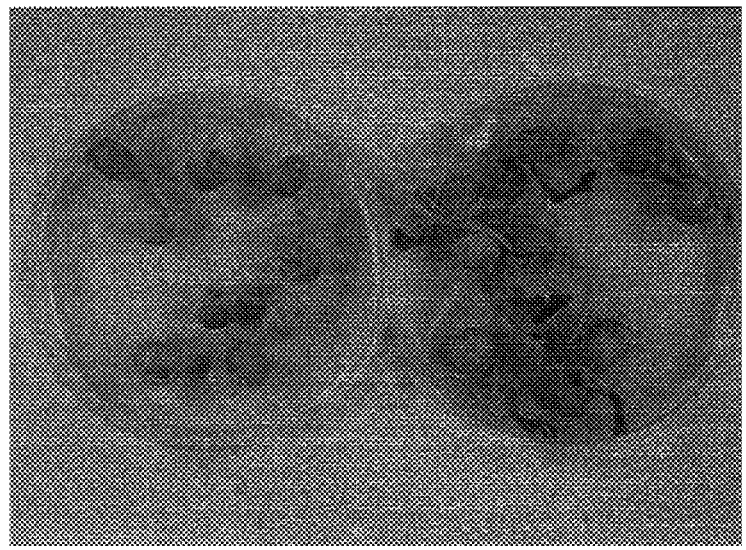
Figure 1: Left untreated control with poor germination and right Icelandic Bioenhancer treated at a dose of 2 ml per liter of water.
Figure 2: Left: Rosemary plants soil treated with a drench of Iceland Bioenhancer at a dose of 5 ml/liter; Right: Untreated control

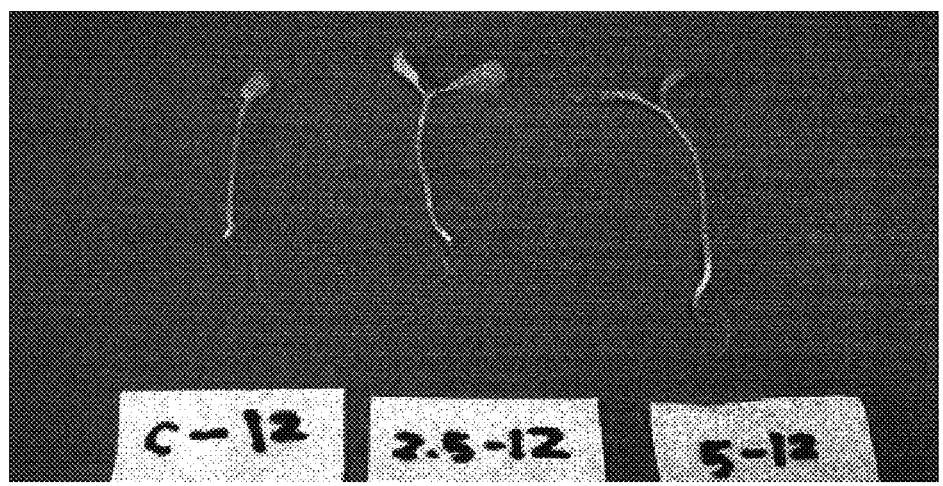
Figure 4: Shoot and Root enhancement in tomato on day 12 following Iceland Bioenhancer treatment.

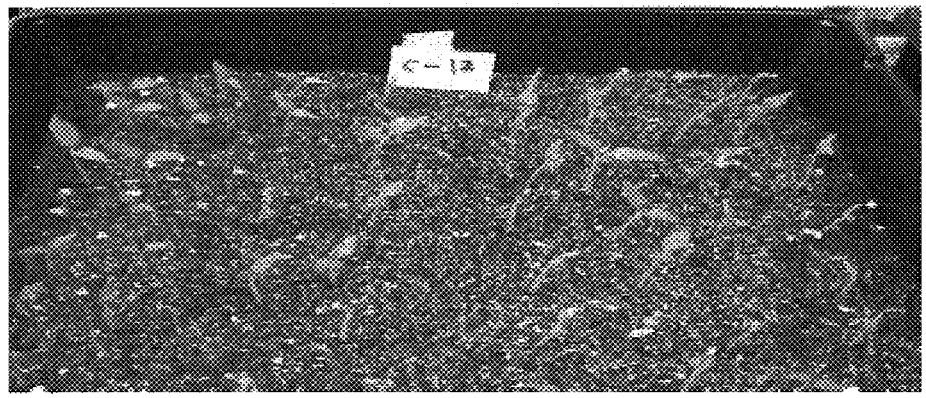
Figure 4A- Control tomato seedlings without Iceland Bioenhancer
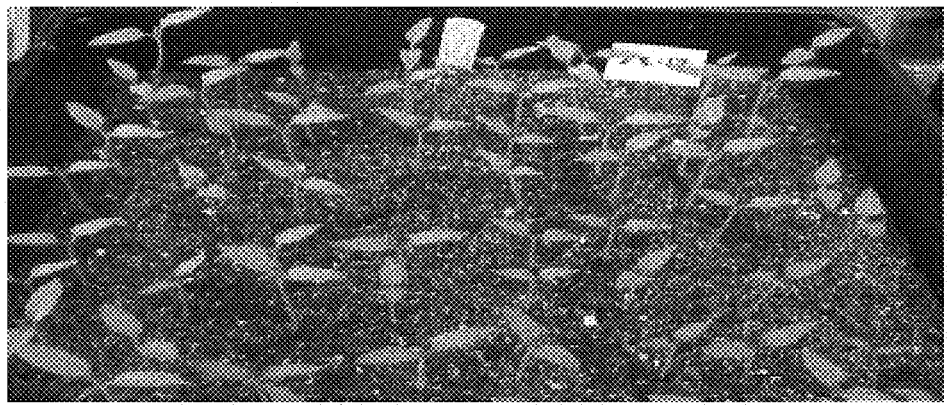
Figure 4B- Iceland Bioenhancer treated at a dose of 2.5 ml/L
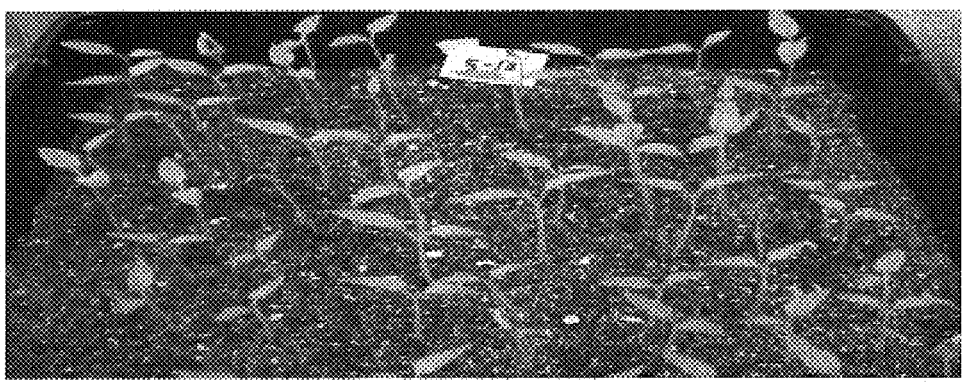
Figure 4C- Iceland Bioenhancer treated at a dose of 5 ml/L

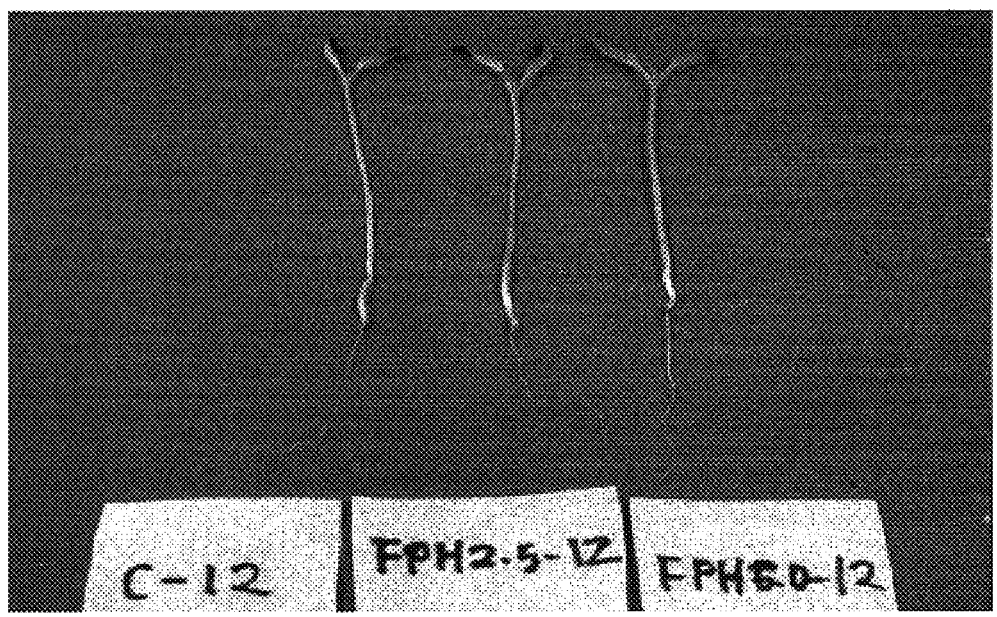
Figure 5: Tomato seedling on day 12 with better root development and vigor with Icelandic Bioenhancer

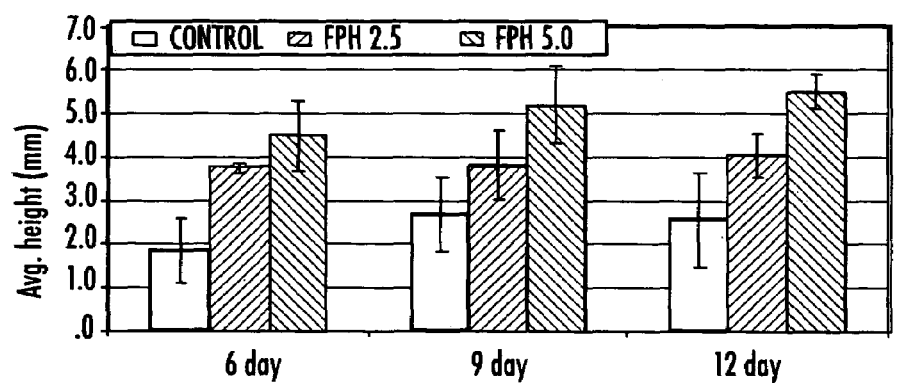
Figure 6: Average height of tomato seedlings by treatment.

ORGANIC COMPOSITIONS AND METHODS OF USE FOR PROMOTING PLANT GROWTH

FIELD OF THE INVENTION

The invention relates to new compositions and methods of increasing valuable traits in agronomically important plants. Compositions of the present invention are formulated from natural organic components including seaweed and fish hydrolysates. Cold-tolerant seaweed species, for example, are preferred for use in compositions of the present invention. Geothermal water, high in sulfur and minerals, is preferred for use in preparing compositions of the present invention by means of bio-processing fermentation. Formulations of the present invention can be applied effectively to a wide variety of plant species to improve valuable agronomic traits including but not limited to growth and yield. The stimulation of the production of phenolic metabolites and aromatic compounds, for example, in treated plants leads to a significantly perceived improvement in the flavor and natural aroma of different crops. A relatively small amount of the bioprocessed compositions described herein are required to be effective in enhancing valuable traits in agronomic crops, thus an affordable advantage is provided, particularly to organic growers.

BACKGROUND OF THE INVENTION

The use of botanical extracts such as seaweed in organic fertilizers has been well known for years and has been successfully developed in the USA and Europe. It is also known that proline is beneficial for improving shoot organogenesis. A natural source of proline and proline precursors can be obtained from fish protein hydrolysates (FPH), a byproduct of the fishery industry. FPH is employed in compositions described herein to stimulate proline synthesis and shoot organogenesis by exploiting the proline-linked pentose phosphate pathway (PPP). In the presence of elevated levels of proline, stimulation of cytokinins and auxin occurs via the PPP and shikimate pathways, respectively. Treatments with FPH significantly increases the endogenous proline content and the extent of development. See, e.g., Milazzo M C, Shetty K., et al., J. Agric. Food Chem., 47(4):1771 (1999).

Genetically modified plants and produce engineered to enhance value-added traits are generally not well-accepted by buyers and consumers in industrialized nations. Moreover, consumers are generally more receptive to organically grown fruits, vegetables and plants in general. Accordingly, a cost-effective solution to meeting the demand for organically grown produce having enhanced agronomic traits would be valuable indeed.

SUMMARY OF THE INVENTION

The present invention is directed to organic compositions and methods for increasing valuable agronomic traits in plants. Particularly, organic compositions of the present invention are comprised of an aqueous solution of seaweed extract and fish hydrolysates. Preferred compositions are comprised of an extract of at least one cold-tolerant seaweed species. Preferred embodiments of the present invention are formulated with geothermal water which is high in sulfur and minerals. In addition, the current invention is directed to a method of preparing organic compositions for increasing valuable agronomic traits in plants comprising mixing seaweed extract with fish hydrolysates and fermenting the mixture with geothermal water. The invention is further directed to methods of applying organic compositions of the present invention to increase valuable agronomic traits in plants.

BRIEF DESCRIPTION OF THE FIGURES

The patent or application file contains at least one drawing executed in color. Copies of this patent or patent application publication with color drawings will be provided by the Office upon request and payment of the necessary fee.

FIG. 1 displays improved vigor of pea seedlings. Left: control. Right: treated at a dose of 2 ml organic composition of the present invention per liter of water.

FIG. 2 shows improved vigor of Rosemary plants. Left: Rosemary plants soil treated with a drench of organic composition of the present invention at a dose of 5 ml/liter. Right: control.

FIG. 4 illustrates Shoot and Root enhancement in tomato seedling on post-germination day 12. A. Control; B. Following treatment at a dose of 2.5 ml organic composition of the present invention/liter water; C. Following treatment at a dose of 5 ml organic composition of the present invention/liter water.

FIG. 5 displays a graph illustration of the results of FIG. 4.

DETAILED DESCRIPTION OF THE INVENTION

Figure 3:
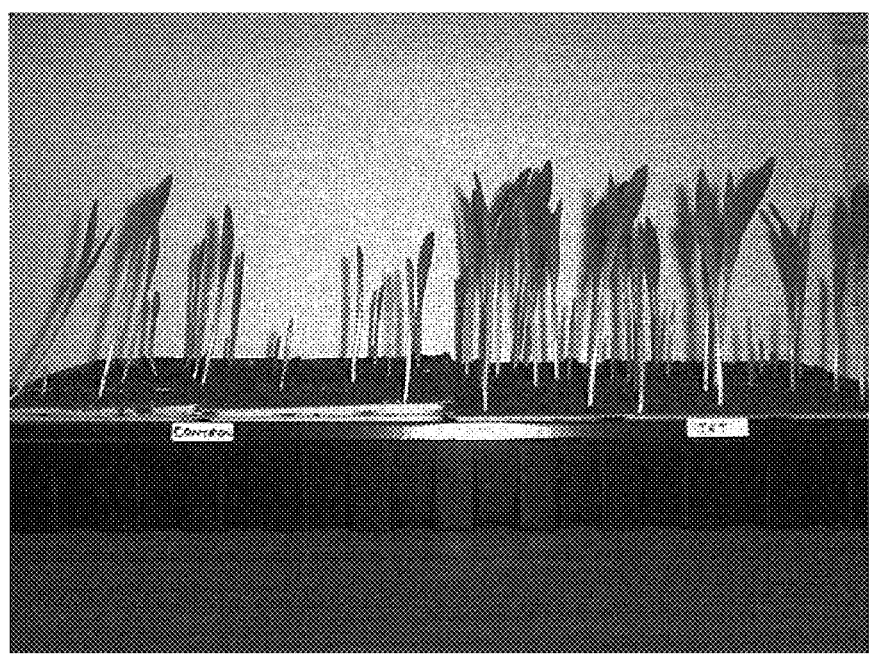
FIG. 3 illustrates enhanced vigor of corn seeds treated with 2 ml organic composition of the present invention/liter of water (right). Left is the control.

Unless defined otherwise, all technical and scientific terms used herein have the same meaning as is commonly understood by one of skill in the art to which this invention belongs. All publications and patents referred to herein are incorporated by reference.

Compositions for increasing valuable agronomic traits in plants are provided comprised of seaweed extract and fish hydrolysate. Methods of preparing compositions of the invention are provided which comprise mixing seaweed extract with fish hydrolysate and fermenting the mixture with Icelandic geothermal water. Methods of increasing at least one valuable agronomic trait in a plant are provided comprising applying a composition comprising seaweed extract and fish hydrolysate to the plant. U.S. Pat. No. 5,906,941, entitled, *Plant Propagation Compositions and Methods* is incorporated herein by reference.

Organic compositions of the present invention are derived from natural sources. Particularly described herein are bio-processed compositions originating from natural marine and botanical extracts for increasing valuable agronomic traits in plants. Compositions of the present invention are a formulated aqueous solution of seaweed extract and fish hydrolysates. Compositions described herein are high in soluble amino acids to induce the proline pathway which is a critical developmental mechanism in plants directly related to valuable agronomic traits. Organic compositions of the present invention stimulate proline synthesis, shoot and root vigor and shoot organogenesis by exploiting the proline-linked pentose phosphate pathway (PPP). The presence of elevated levels of proline confers stimulation of cytokinins and auxin occurs via the PPP and shikimate pathways, respectively. Treatments with compositions of the present invention significantly increase the endogenous proline content and the extent of plant root and shoot development and strength. Compositions of the present invention also contain natural plant growth promoting substances including, for example, cytokinins, auxins and amino acids such as proline, glutamic acid and arginine. Formulations described herein are used effectively on a wide variety of plant species to improve growth and yield. A relatively small amount of the bioprocessed composition is required to enhance valuable traits in agronomic crops. Accordingly, an affordable advantage is provided particularly to organic growers.

Fish and seaweed for use in preparing organic compositions (fermented product) of the present invention are preferably harvested from cold waters of the North Atlantic, e.g., off the coast of Iceland. However, compositions of the present invention may be prepared using a myriad of ingredients similar to those described herein, e.g., fish, seaweed, and water from around the world.

The world annual fish catch has been estimated to be approximately 71 million tons, only about 25 tons of which is used for human food. About 20 million tons is caught specifically to be made into fish meal. Of the remaining 26 million tons of "waste", about half is recovered for fish meal, while the rest is made up of bones and offal. Mackie, Process Biochem., 17:26–31 (1982). This solid waste is high in protein. Fishery by-products, i.e., soluble fish protein hydrolysate (SFPH) are made from the solid waste left behind after fish processing. See, U.S. Pat. No. 5,906,941, entitled *Plant Propagation Compositions and Methods*, incorporated herein by reference.

Fermenting Fish to Produce a Soluble Fish Protein Hydrolysate (SFPH)

Compositions of the present invention are generally comprised of slightly acidified amino acids such as glutamic acid, arginine and proline obtained from fermentation of fish to prepare hydrolysates. Fish hydrolysates are particularly preferred from capelin (and other pelagic fish species), herring and menhaden and are enriched by means of the process described herein in glutamic acid, arginine, and proline. The first stage of the process of preparation of compositions of the present invention is the initial stage of fermentation wherein fish and/or portions or remains after processing ("fish") are added to a tank (grinding or physical mincing of the fish is optional). For example, 1000 kg of fish may be added to a 1200 liter tank at room temperature (~20–26° C.), e.g., 23° C. Temperature, however, is not a critical aspect of the process of the invention. Indeed, processes described herein may be carried out well below or well above room temperature. The temperature at which the process is carried out merely affects an amount of time otherwise required for fermentation. The initial stage of fermentation is preferably, although not necessarily, enhanced by the addition of about, for example, 3% to about 5% v/w lactic acid to the tank holding the fish. For example, to a tank holding about 1000 kg fish about 25 to about 60 ml lactic acid may be added to enhance the fermentation process. Lactic acid is a by-product of the dairy industry and is readily available from many different commercial sources. Alternative acids to lactic acid that may similarly be employed to enhance this fermentation process include, for example, citric acid, acetic acid, and malic acid. However, in addition to lactic acid (or citric acid, acetic acid, or malic acid) the addition of about 1% to about 2% v/w formic acid is also preferably employed to enhance the fermentation process. Industrial grade formic acid is available from a wide variety of commercial sources. The initial fermentation process is generally allowed to proceed in the tank for about three (3) to about ten (10) days before the addition of seaweed extract. About four (4) to five (5) days, for example, is a usual initial incubation period of fish fermentation at room temperature for the production of SFPH.

Homogenized Seaweed

Seaweed extracts, for example, from cold-tolerant Icelandic species are preferred for use in the preparation of compositions of the present invention. Extracts from cold-tolerant seaweed species, e.g., the genus *Laminaria* (PHEOPHYCEES) (e.g., *Laminaria hyperborea, Laminaria digitata* and *Laminaria nigripes*) may be used. Seaweed extract from *Laminaria* species growing in cold water generally contain proline in the range of 0.1–0.5% and phenolics in the range of 0.1%–0.25%. These same extracts produce 0.01% to 0.05% cytokinins. Accordingly, seaweed extracts employed in compositions of the present invention generally provide a source of cytokinins which contribute significantly to the stimulation of shoot growth. Cold-tolerant (e.g., Icelandic) species also, for example, have natural stress modulators from the proline pathway.

Seaweed is collected and preferably dried. Heat dried seaweed is preferred which has about 10–20% water content. The texture is approximately that of paper. The seaweed is powderized. Although particle size is not intended to be a limitation of the claims appended hereto, an average particle size of crushed and/or "blended" seaweed may be between about 0.5 mm to about 5 mm. Seaweed may be, for example, homogenized into a paste using a blender. The term homogenized, as used herein, however, refers to all of the above descriptions in this paragraph. The seaweed extract for use in the method described herein is preferably prepared by combining about 10% to about 20% dried/ground seaweed with water w/v. Geothermal water relatively high in sulfur, for example, and minerals (e.g., Icelandic), is preferred.

Bio-Processing Fermentation

Seaweed extract described herein is then added to the initial fermentation (SFPH production) process described supra. Homogenized seaweed is added to the SFPH to produce a volume so that at least about 1% but less than about 20% of the volume is initially due to seaweed. The term seaweed, as used herein, generally refers to seaweed, per se, including all cell contents. Generally, about 10% to about 25% seaweed extract v/v is added to the fermenting SFPH. Accordingly, for example, to accomplish 20% v/v seaweed extract, about 200 liters seaweed extract is added to about 800 liters initially fermenting SFPH. The volume is then fermented to hydrolyse the seaweed and to further hydrolyse the SFPH. Bio-processing (fermentation) is continued for about five (5) to about twenty (20) more days (past step 1, the initial stage of fermentation or initial SFPH preparation). About ten (10) days is preferred at room temperature (~20–26° C.), e.g., 23° C. However, temperature is not a limitation. Organic acid and natural fermenting extracts of fish are allowed to ferment and naturally disassociate and hydrolyse the fish and seaweed in natural high sulfur geothermal water. When the period of bio-processing fermentation of the SFPH/seaweed extract (preferably prepared with geothermal water) is substantially complete, the fermenting mixture is preferably—stirred and transferred to separate container(s) (e.g., drums)- and allowed to gravity-settle for about five (5) to about ten (10) days (alternatively, to speed the separation aspect of the process, the mixture could be subject to centrifugation). The bio-processing fermentation mixture is generally separated into three (3) layers or phases. The resulting top layer (soluble upper phase), about 40% of the volume, is the primary organic aqueous liquid composition of the present invention (referred to herein as the organic composition of the present invention). The resulting top layer, which is the organic composition for increasing valuable agronomic traits in plants, is separated from the volume. The "organic composition" is thereby separated and bottled. The lower solid phase may be blended with other solid organic compost material, for example, to make solid fertilizer.

Among the important amino acids enriched in the resulting organic composition of the present invention are the acidified amino acids, e.g., glutamic acid (generally 6%–10% of soluble nitrogen), arginine (3–5% of soluble nitrogen), and proline (2–4% of soluble nitrogen). In addition, phenolics result in the range of 0.1%–0.2%. The sulfur content, from geothermal water, is also enriched from, for example, 0.05%–0.1%. Acidified amino acids are key organic stimulators of the stress modulating proline-linked pentose phosphate pathway. Acidified amino acids provide benefits, for example, to stimulate soil conditioning microorganisms and plant promoting micro-organisms. Fish extracts employed in compositions of the present invention provide small fatty acids that are anti-microbial against acid intolerant plant bacterial pathogens.

Bio-processing fermentation, for example, using geothermal water (e.g., Icelandic) high in sulfur and minerals and the enhanced stress modulating natural compounds derived from seaweed together with the fish extracts described herein, provides key advantages. Accordingly, preferred water for use in fermenting compositions of the present invention is geothermal water enriched in sulfur, e.g., from Icelandic geothermal sources.

Liquefaction is carried out by enzymes already present in the fish. Liquefaction is entirely due to autolysis which can be enhanced by temperature control. At higher temperature of 20–30° C. liquefaction occurs rapidly. However, this process is slower at lower temperatures. See, e.g., Tatterson, I. N., et al., J. Sci. Food Agric., 25: 369–379 (1974). Acids may be added to provide favorable conditions for enzyme activity and inhibition of spoilage bacteria. Formic acid of about 3% has been used in many studies with good results. However, citric acid and lactic acid from beverage and milk processing can be used effectively from 0.5% to 5%.

The acidic treatment (lactic and formic acid) is performed in a blend with Icelandic seaweed with Icelandic geothermal water high in sulfur. This is uniquely targeted to caplein fish species at low levels of fat content (1%–5%) after spawning and, for example, can be extended to other pelagic fish species such as menhaden and herring. Once the fish silage-seaweed is made from sulfur geothermal water, it becomes enriched in amino acids glutamic acid, proline and arginine. Caplein species, for example, about 1000 kg or its multiples are hauled by fishing boats from coastal Iceland and added to tanks ranging from 1000 kg capacity to 12,000 kg capacity. The fish can be ground in some cases before adding. The moisture content of fish is about 75%–80% and ash content of about 3.5–4.5%. The oil content at this stage ranges from 1%–5% (low fat) following spawning. The total nitrogen content is about 1.7% to 2.0%. Fresh fish is added to tanks with and without grinding and a combination, for example, of 2%–3% lactic acid from dairy processing waste in Iceland and 1%–2% formic acid. The enzymatic breakdown and natural fermenting (natural bacterial flora in fish gut and enzymes) fish silage is converted into a homogenous mince. To this about 10%–20% of algae, preferably Icelandic algae, may be added in geothermal water blend in the first 1–3 days after the initial fermentation and further allowed to ferment and enzymatically be converted into soluble nitrogen containing both the seaweed and soluble fish protein.

Compositions

Organic compositions of the present invention are water based and are formulated for a wide array of different dilutions with water in order to address a wide array of different applications. Dilution of compositions described herein is related to the particular application. In general, a dosage of 1–25 ml organic composition/liter water is preferred as soil drench, seed treatment or foliar application; however, up to about fifty (50) ml organic composition of the present invention may be used per liter of water. Compositions of the present invention are capable of stimulating the proline-linked phenolic pathway in plants and acting as a bioenhancer at very low levels of 2–10 ml organic composition/liter of water. Dilution of the organic compositions, for example, are in the range of 1–5 ml organic compositions/liter water. Higher concentrations of compositions of the present invention, e.g., in the range of 5–25 ml/liter water, are preferred for application to shrubs and trees.

Organic compositions of the present invention may be formulated to address different issues faced by various growers. Natural extracts may be included in the compositions, for example, to facilitate and enhance to viability and growth of certain target species; however, other target species can be disadvantaged and thereby eliminated. Botanical extracts and complex polysaccharides Laminarin from *Laminaria*, for example, further increase the plant stimulating antioxidant properties of compositions of the invention. Other herbal extracts from the family Lamiaceae used up to 5% w/v of organic compositions of the present invention, garlic extracts 5% extract of dry garlic extract in water (10 gram/100 ml extract) and use 1:20 dilution of the organic compositions of the present invention are added, for example, which, inter alia, increase anti-fungal properties. Neem extract, same as herbal extract, is further employed in compositions of the invention to increase natural anti pesticide activity around the root zones. The activity can also be enhanced by other herbs added to it at 1% levels such as oregano, rosemary, thyme and other species in the botanical family Lamiaceae. For enhanced pesticide and antimicrobial properties of herbs, neem, onion waste and garlic extracts can be added at levels from 1%–5%.

Compositions described herein improve the growth and yield of agronomically important plants by the enhancement of root as well as shoot growth thus modifying the resulting structure of the plant. Organic compositions of the present invention are well suited for promoting the growth of flowers, fruits, vegetables, as well as shrubs and trees. The stimulation of the production of phenolic metabolites and aromatic compounds in treated plants leads to a significantly perceived improvement in the flavor and natural aroma of different crops. The phenotypic quality of treated flowering plants is also increased. Compositions of the present invention are also employed as a medium for seed germination (e.g., overnight soaking) and seed vigor stimulator. Compositions of the present invention may also be used, for example, as compost stimulator.

Bio-Remediation

Compositions of the present invention moreover enrich treated soil directly and/or indirectly with beneficial microorganisms. This aspect of the present invention, for example, provides a means for significant improvement of soil symbiotic relationships including nitrogen fixing bacteria thus affecting soil improvement, particularly of marginal and dead soils.

Compositions described herein are particularly suitable for bio-remediation of flora habitation or regeneration otherwise of contaminated marginal or dead land (e.g., superfund sites) including but not limited to, for example, sites of petroleum, PCB, polyaromatic hydrocarbons, and/or dioxin contamination. Compositions of the present invention may be used, for example, to re-vegetate a contaminated area with a vegetation source such as Alfalfa and/or grasses and/or other monocot species. However, dicots, such as corn and other agronomic crops, may similarly be employed with compositions of the present invention, for example, to regenerate contaminated sites. As a corollary, the regeneration of plants in this manner, which demonstrate improved anti-oxidant response and hence detoxification of compounds, particularly carcinogenic agents, has significant impact on neutralizing and reducing the level and proximity of toxins.

Improved Root Growth

Compositions of the present invention promote the growth of beneficial soil bacteria in the plant root environment that in turn promote root development. Application of about 25–50 ml per liter of organic composition, for example, as a soil drench significantly enhanced the population of soil microflora that promote plant growth. Treatment with compositions of the present invention also facilitates the association of beneficial bacteria in the root environment that inhibit the growth of plant pathogens. Treatment of plant soil with compositions of the present invention particularly facilitates and promotes the growth of microorganisms that degrade organic matter and makes nutrients more easily available to plants. Organic compositions of the present invention also are employed to confer an improved regeneration of cuttings and new plants.

Organic compositions of the present invention may be used to benefit the production of fruits including, for example, the transplant of strawberries and cranberry plants in bogs for enhanced growth and improved fruit quality. A dose of 2 ml of an organic composition of the present invention diluted in 1 liter of irrigation water, for example, has been demonstrated to enhance significantly the growth of strawberry and raspberry vegetative plants from tissue culture. Particularly, treatment at periods of watering during propagation of transplants significantly enhances adaptation and survival. Strawberry varieties, for example, that normally exhibit poor transplanting characteristics have demonstrated an improvement of survival from 20% to 80% with treatment using the organic composition described herein. Increased widths of stems and roots, for example, are exhibited by transplanted plants treated with compositions of the present invention. Field adjustment of treated plants is moreover improved using compositions of the present invention. Berry plants in the field, for example, may be treated using 10 ml of undiluted composition/liter of irrigation water per liter (e.g., sprayed on leaves every 30 days for strawberry). Berry plants, for example, may also be treated by means of irrigation. Raspberry and blackberry, for example, may be treated by means of administering about 25 ml per liter water to the soil every 30 days at an application rate of about 400 to about 1000 liter per hectare. This technology is now suitable for all transplant seedlings going from greenhouse to field such as tomato and other transplant seedlings particularly where 99%–100% survival rate is required.

Improvement of Vegetative and Fruit Yields

Soil application of about 50 ml organic composition of the present invention/liter of irrigation water at 30 day intervals with regular watering enhances the yield and size, inter alia, of tomato and egg plant, for example, between 15% to 20%, compared to absence of such application. The quality of the fruit and vegetables is generally better, i.e., fresher, with better size, pigmentation, and taste. These benefits are expected with all types of vegetables, including cucumbers, squash, and melons, where preliminary results are promising.

An application of about 25 ml organic composition per liter of irrigation water is sprayed, for example, in the spring during early vegetative phase of perennial fruit stands such as cranberry. An application of about 10 ml per liter may be applied, for example, during the flowering phase and/or about 10 days prior to harvest. These applications improve pigmentation as well as fruit quality and yield.

An application of about 50 ml organic composition/liter of irrigation water may be employed to treat fruit orchards, for example, as a soil drench every 30 days during the growing season. Each application may be up to water holding capacity or an application rate of about 1000–1500 liter per hectare depending on soil type and temperature. In temperate regions for apples and temperate fruits an application rate can be about 1000 liter per hectare. Treatment using about 1500 liters per hectare is suitable, for example, for citrus and Tropical and Sub-Tropical fruits.

Improvement of Growth and Stress-Adaptation of Transplant Seedlings when Moved from the Greenhouse to an Outdoor Soil Environment.

Leaf spray and/or soil-based drench application at a dose of about 2–5 ml organic composition/liter of irrigation water improves the survival of all greenhouse transplanted plants. Particularly, spray or soil drench and/or foliar application prior to transplanting enhances the strength of treated plants' stems through apparent increased lignification. Survival of transplants is significantly improved as well as conferred increased foliage and aesthetic traits. In case of seeded transplants, treatment prior to germination in addition is very useful, of course, before application as a soil drench or foliar spray.

Improvement of Seed Vigor in Seeded Crops

Organic compositions of the present invention stimulate amino acid metabolism including proline and stimulate plant growth regulators for improved vigor and robustness of the germinating seeds. Accordingly, organic compositions presented herein are successfully employed to enhance seed vigor during seed germination. Seeds are treated, for example, in a solution of about 2–5 ml organic composition per liter of irrigation water for 2–3 hours and air-dried before germination. Appropriate volume may be readily determined based on the species-recommended seed rate and area of planting. Seed treatment generally translates into 10–20% improvement in germination rate and vigor than without the treatment. Pre-germination treatment is successful for all seeded plants, including, but not limited to cereals, legumes, vegetables and ornamentals. This is particularly preferred for germination of annuals, but can be employed to benefit the germination of large seeds as well. The use of compositions described herein is suitable for home gardens, particularly for growing vegetables.

Enhancement of Turf Grass Vegetative Phase under Cold Conditions

The organic compositions of the present invention are particularly useful to control water stress conditions and cold stress conditions. The soluble amino acids and peptides within compositions of the present invention stimulate light response and growth in plants. Treated vegetation is able to better grow, for example, in available light conditions. Application of about 10–25 ml organic composition per liter of irrigation water (higher dose in colder latitudes), for example, after mowing improves the vigor of lawn grass. Treatment stimulates rejuvenation of grass under cold spring conditions with much success. An application rate of about 400 liters per acre is recommended.

Improvement of Vegetative Development and Flowering in Ornamentals

Application of organic compositions of the invention as a foliar spray, for example, is particularly advantageous in promoting the vegetative development and flowering of ornamentals. Green vegetative phase with more branching and enhanced flowering can be expected when about 10–20 ml organic composition/liter of irrigation water is applied every 30 days, for example, during the growing season in gardens and outdoor field environments.

EXAMPLES

Example I

Seed Treatment (for Soft Coated Fruit and Vegetable and Other Seeds)
 a) Add 5 ml organic composition per one (1) liter of irrigation water.
 b) Soak seeds for 2–3 hours for soft coated seeds.
 c) Dry seeds in air in room temperature for 1–2 hours.
 d) Sow the seeds as per seed producer's instructions.
 e) Use the residual soak water as a soil drench and sprinkle over the soil after sowing.

For hard coated seeds, soak for 12 hours overnight in step b) and dry seeds in step c) for 2–5 hours before sowing.

Example II

Improvement of Early Vegetative Growth (Green Phase 1)
 a) Following germination use a dose of 5 ml organic composition per one (1) liter of irrigation water.
 b) Spray a rate of about 1000 liters per hectare or 400 liters per acre with a complete leaf drench. Adjust dosage for lesser area.
 c) Spray every 10 days until day 30.
For grasses, use above dosage after lawn mowing

Example III

Improvement of Mid-Vegetative Phase (Green Phase 2)
 a) Use a dose of 10 ml organic composition per liter of irrigation water.
 b) Spray a rate of about 1000 liters per hectare or 400 liters per acre with a complete leaf drench. Adjust dosage for lesser area.
 c) Spray every 10 days until day 60.
 d) Use dose of 25 ml per liter for shrubs, perennials and more woody stemmed species.

Example IV

Improvement of Late-Vegetative Phase (Flowering and/or Seed Phase)
 a) Use a dose of 10 ml organic composition per liter of irrigation water.
 b) Spray a rate of about 1000 liters per hectare or 400 liters per acre with a complete leaf drench. Adjust dosage for lesser area.
 c) Spray every 10 days until day 100.
 d) Use dose of 50 ml per liter for shrubs, perennials and more woody stemmed species.

Example V

Trees and Perennial Potted Plants
 a) Use dose of 50 ml organic composition per one (1) liter.
 b) Give one good soil soak up to water holding capacity (not excess) every 30 days from May until September for out-door plants only.
 c) The remaining time when the soil is dry provide only regular water as needed.
 d) The general requirement is about 1 liter for a large ornamental tree with 20 inch pot size and 100 ml to 250 ml for pot size of greater than 10 inches.
 e) Reduce dose to 25 ml per one (1) liter for pots less than 10 inches and reduce application volume until is the soil is wet only up to water holding capacity and not excess water.

Non-marine based Organic proteins from soy seed wastes and dairy whey proteins with final nitrogen levels of 1% is available for Indoor Plants, where the application can be done every 45 days with regular watering at a dose of 25 ml per one (1) liter of irrigation water.

All publications and patents mentioned in the above specification are herein incorporated by reference. Various modifications and variations of the described compositions and methods of the invention will be apparent to those skilled in the art without departing from the scope and spirit of the invention. Although the invention has been described in connection with specific preferred embodiments, it should be understood that the invention as claimed should not be unduly limited to such specific embodiments. Indeed, various modifications of the described compositions and modes for carrying out the invention which are obvious to those skilled in the art or related fields are intended to be within the scope of the following claims.

What is claimed is:

1. A method of preparing an organic composition for enhancing valuable agronomic traits in plants, comprising:
 a) fermenting fish to produce a soluble fish protein hydrolysate (SFPH) enriched in proline, said fish being harvested from cold waters of the North Atlantic,
 b) adding homogenized seaweed with geothermal water enriched in sulfur to the SFPH to produce a volume so that at least about 1% but less than about 20% of the volume is seaweed, said seaweed comprising a cold tolerant seaweed species enriched in proline,
 c) fermenting the volume for a period of time between about five (5) and about twenty (20) days to hydrolyse the seaweed and to further hydrolyse the SFPH, and
 d) separating a resulting soluble top layer from the volume, which top layer is the organic composition for increasing valuable agronomic traits in plants.

2. A method of preparing an organic composition according to claim 1 further comprising adding an acid selected from the group consisting of lactic, citric, acetic, and malic to the fish to enhance fermenting the fish.

3. A method of preparing an organic composition according to claim 2 further comprising adding formic acid to the fish to enhance fermenting the fish.

4. A method of preparing an organic composition according to claim 1 wherein a majority portion of the fish are pelagic fish species.

5. A method of preparing an organic composition according to claim 3 wherein at least about 30% of the fish are selected from the group consisting of capelin, herring and menhaden.

6. A method of preparing an organic composition according to claim 1 wherein a duration of step a), fermenting fish, proceeds for a period of time between about three (3) and about ten (10) days.

7. A method of preparing an organic composition according to claim 5 wherein a duration of step a), fermenting fish, proceeds for a period of time between about three (3) and about ten (10) days.

8. A method of preparing an organic composition according to claim 7 wherein at least about 30% of the seaweed added in step b) is of the genus Laminaria (PHEOPHYCEES).

9. A method of preparing an organic composition according to claim 8 wherein the homogenized seaweed comprises at least about 50% said geothermal water.

10. A method of preparing an organic composition according to claim 8 wherein steps a) and c) are substantially performed at a temperature between about 12° C. and about 32° C.

11. A method of preparing an organic composition according to claim 9 wherein steps a) and c) are substantially performed at a temperature between about 18° C. and about 28° C., and the resulting soluble top layer amounts to between about 30% and about 50% of the volume.

12. An organic composition product for enhancing valuable agronomic traits in plants, produced by the process of:
  a) fermenting fish to produce a soluble fish protein hydrolysate (SFPH) enriched in proline, said fish being harvested from cold waters of the North Atlantic,
  b) adding homogenized seaweed with geothermal water enriched in sulfur to the SFPH to produce a volume so that at least about 1% but less than about 20% of the volume is seaweed, said seaweed comprising a cold tolerant seaweed species enriched in proline,
  c) fermenting the volume for a period of time between about five (5) and about twenty (20) days to hydrolyse the seaweed and to further hydrolyse the SFPH, and
  d) separating a resulting soluble top layer from the volume which is the organic composition for increasing valuable agronomic traits in plants.

13. The organic composition product of claim 12, wherein a majority portion of the fish are pelagic fish species.

14. The organic composition product of claim 13, wherein a duration of step a), fermenting fish, proceeds for between about three (3) and about ten (10) days.

15. The organic composition product of claim 14, wherein at least about 30% of the seaweed added in step b) is of the genus Laminaria (PHEOPHYCEES) and the homogenized seaweed comprises at least about 50% said geothermal water.

16. The organic composition product of claim 12 further comprising aqueous herbal extracts.

17. The organic composition product of claim 12 further comprising one or more selected from the group consisting of aqueous herbal extracts, neem extracts, onion waste and garlic extract.

18. The organic composition product of claim 12 further comprising aqueous botanical extracts from the family Lamiaceae.

19. A method of applying an organic composition, to enhance at least one valuable agronomic trait in a plant, produced by the process of:
  a) fermenting fish to produce a soluble fish protein hydrolysate (SFPH) enriched in proline, said fish being harvested from cold waters of the North Atlantic,
  b) adding homogenized seaweed with geothermal water enriched in sulfur to the SFPH to produce a volume so that at least about 1% but less than about 20% of the volume is seaweed, said seaweed comprising a cold tolerant seaweed species enriched in proline,
  c) fermenting the volume for a period of time between about five (5) and about twenty (20) days to hydrolyse the seaweed and to further hydrolyse the SFPH, and
  d) separating a resulting soluble top layer from the volume which is the organic composition useful for enhancing valuable agronomic traits in plants; and applying the organic composition to a plant in an amount effective to enhance at least one valuable agronomic trait in a plant.

20. A method of applying an organic composition according to claim 19 wherein at least about 30% of the fish are selected from the group consisting of capelin, herring and menhaden, and a duration of step a), fermenting fish, proceeds for between about three (3) and about ten (10) days.

21. A method of applying an organic composition according to claim 20 wherein at least about 30% of the seaweed added in step b) is of the genus Laminaria (PHEOPHYCEES) and the homogenized seaweed comprises at least about 50% said geothermal water.

* * * * *